(12) United States Patent
Huang et al.

(10) Patent No.: US 12,480,637 B2
(45) Date of Patent: Nov. 25, 2025

(54) REFLECTOR AND ILLUMINATION DEVICE A REFLECTIVE LAYER AND HOMOGENIZATION LAYER WITH PARTICLES DISPOSED WITHIN A PACKAGING MATERIAL

(71) Applicant: QISDA CORPORATION, Taoyuan (TW)

(72) Inventors: Ching-Tze Huang, Taoyuan (TW); Yu-Cheng Chen, Taoyuan (TW); Wei-Chi Su, Taoyuan (TW); Ping-Chung Chou, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 0 days.

(21) Appl. No.: 18/946,967

(22) Filed: Nov. 14, 2024

(65) Prior Publication Data

US 2025/0172272 A1 May 29, 2025

(30) Foreign Application Priority Data

Nov. 27, 2023 (CN) .......................... 202311589655.2

(51) Int. Cl.
*F21V 7/28* (2018.01)
*F21V 5/00* (2018.01)
*F21V 9/40* (2018.01)

(52) U.S. Cl.
CPC ................ *F21V 7/28* (2018.02); *F21V 5/002* (2013.01); *F21V 5/008* (2013.01); *F21V 9/40* (2018.02)

(58) Field of Classification Search
CPC ..... F21V 7/28; F21V 7/22; F21V 7/24; F21V 9/40
See application file for complete search history.

(56) References Cited

FOREIGN PATENT DOCUMENTS

CA              2575799  A1 *  3/2006  ................ F21V 7/28

* cited by examiner

*Primary Examiner* — Robert J May

(57) ABSTRACT

A reflector is applied to an illumination device and includes a reflection layer and a homogenization layer. The reflection layer is used to reflect an illumination beam passing into the reflector. The homogenization layer is disposed on the reflection layer. The homogenization layer includes packaging material and a plurality of homogenization particles. The plurality of homogenization particles is distributed inside the packaging material, and can be made of at least one of transparent material and opaque material. An illumination range of the illumination beam is enlarged by optical refraction and optical reflection provided by the plurality of homogenization particles of the homogenization layer.

20 Claims, 2 Drawing Sheets

REFLECTOR AND ILLUMINATION DEVICE A REFLECTIVE LAYER AND HOMOGENIZATION LAYER WITH PARTICLES DISPOSED WITHIN A PACKAGING MATERIAL

BACKGROUND OF THE INVENTION

1. Field of the Invention

The present invention relates to a reflector and an illumination device, and more particularly, to a reflector of enlarging a visual range of a solid state light source to provide uniform illumination and a related illumination device.

2. Description of the Prior Art

A conventional white light source system utilizes the laser light source to provide the blue light beam, and the blue light beam is split to the blue light beam and the yellow light beam via the light diffusion module and the wavelength transformation module, and the blue light beam and the yellow light beam are mixed to provide the white light beam. Due to the light type feature of the laser beam, the white light beam that is generated by the laser light source and the light diffusion module and the wavelength transformation module has drawbacks of the small illumination range and the restricted application. Therefore, design of a white light source system of enlarging a visual range of the solid state light source to provide uniform illumination is an important issue in the optical equipment design industry.

SUMMARY OF THE INVENTION

The present invention provides a reflector of enlarging a visual range of a solid state light source to provide uniform illumination and a related illumination device for solving above drawbacks.

According to the claimed invention, a reflector includes a reflection layer and a homogenization layer. The reflection layer is adapted to reflect an illumination beam entering the reflector. The homogenization layer is disposed on the reflection layer and includes packaging material and a plurality of homogenization particles. The plurality of homogenization particles is distributed inside the packaging material, and made of at least one of transparent material and opaque material. An illumination range of the illumination beam is enlarged by optical refraction and optical reflection provided by the plurality of homogenization particles of the homogenization layer.

According to the claimed invention, a refractive index of the packaging material is greater than a refractive index of the plurality of homogenization particles. The homogenization layer includes the plurality of homogenization particles individually made of the transparent material and the opaque material and uniformly mixed and distributed in all areas of the homogenization layer.

According to the claimed invention, an illumination device includes a solid state light source, a light splitting element, a wavelength transformation module and a reflector. The solid state light source is adapted to provide a first illumination beam with a first wavelength. The light splitting element is disposed adjacent to the solid state light source, and adapted to allow passing of some part of the first illumination beam and reflect other part of the first illumination beam, and further allow passing of a second illumination beam with a second wavelength. The wavelength transformation module is disposed on a side of the light splitting element, and adapted to receive the first illumination beam reflected from the light splitting element to generate the second illumination beam with the second wavelength. The reflector is disposed on a position of the light splitting element opposite to the solid state light source and the wavelength transformation module. The reflector includes a reflection layer and a homogenization layer. The reflection layer is adapted to reflect the first illumination beam from the light splitting element. The homogenization layer is disposed on the reflection layer and includes packaging material and a plurality of homogenization particles. The plurality of homogenization particles is distributed inside the packaging material, and made of at least one of transparent material and opaque material. An illumination range of the first illumination beam is enlarged by the plurality of homogenization particles so as to mix the first illumination beam with the second illumination beam.

According to the claimed invention, the illumination device further includes a first collimator lens and a second collimator lens, the first collimator lens is disposed between the light splitting element and the wavelength transformation, and the second collimator lens is disposed on another side of the light splitting element opposite to the solid state light source and the wavelength transformation module.

The reflector of the present invention can dispose the reflection layer on a bottom of the homogenization layer, and further dispose the homogenization particles inside the packaging material to form the coating with the homogenization function. The homogenization particles can preferably reflect some part of the first illumination beam and further allow passing of other part of the first illumination beam. The homogenization particles 36 can be made of the ceramic sintering technology. The non-metallic inorganic material with ionic bonds (such as silica glass, quartz, or other silicon material) can be processed into powders, and the powders can be sintered at the high temperature to grow the powders into the crystal grain for forming the homogenization particles. The light beam can pass through gaps between the homogenization particles, and can be reflected by the rough surface or the smooth surface of the homogenization particles via the diffuse reflection or the specular reflection, so as to avoid generation of laser speckle and achieve a purpose of the homogenization function.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
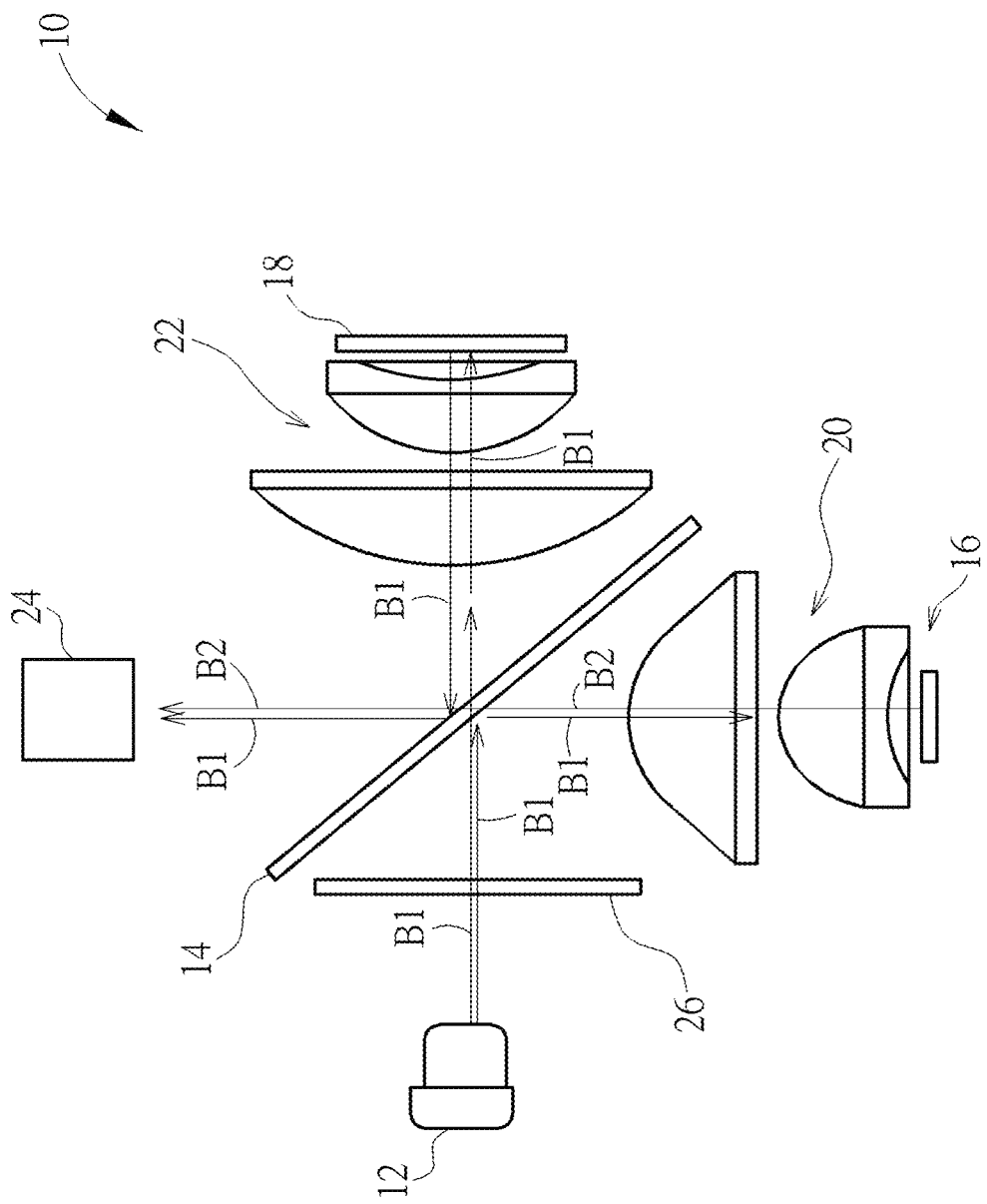
FIG. 1 is a functional block diagram of an illumination device according to an embodiment of the present invention.

Please refer to FIG. 1. FIG. 1 is a functional block diagram of an illumination device 10 according to an embodiment of the present invention. The illumination device 10 can optionally include a solid state light source 12, a light splitting element 14, a wavelength transformation module 16, a reflector 18, a first collimator lens 20, a second collimator lens 22 and a light pipe 24. The illumination device 10 can utilize the reflector 18 to reflect some part of incident light and further allow passing of other part of the incident light, so as to enlarge a visual range of the solid state light source 12 for providing a uniform illumination function. The illumination device 10 can be mainly applied for a white light illumination device that is used to provide uniform illumination intensity, such as the headlight of the vehicle; however, application of the illumination device 10 is not limited to the foresaid embodiment. In the embodiment, the solid state light source 12 can generate a blue light beam, and the wavelength transformation module 16 can transform the blue light beam into a yellow light beam. The blue light beam and the yellow light beam can be mixed to generate a white light beam for being received by the light pipe 24.

The solid state light source 12 can provide a first illumination beam B1 with a first wavelength, such as the blue light beam. The wavelength transformation module 16 can be disposed on a side of the light splitting element 14 to the same as the solid state light source 12, and used to receive the first illumination beam B1 reflected by the light splitting element 14 for generating a second illumination beam B2 with a second wavelength, such as the yellow light beam. The light splitting element 14 can be disposed adjacent to the solid state light source 12 and the wavelength transformation module 16, and can reflect some part of the first illumination beam B1 and further allow passing of other part of the first illumination beam B1, and further allow passing of the second illumination beam B2 with the second wavelength. The reflector 18 can be disposed on a position of the light splitting element 14 opposite to the solid state light source 12 and the wavelength transformation module 16. The reflector 18 can generate reflected light with more uniform angular distribution.

The first collimator lens 20 can be disposed between the light splitting element 14 and the wavelength transformation module 16. The second collimator lens 22 can be disposed on another side of the light splitting element 14 opposite to the solid state light source 12 and the wavelength transformation module 16. In addition, an optical diffusion element 26 can be optionally disposed between the solid state light source 12 and the light splitting element 14. When the first illumination beam B1 provided by the solid state light source 12 passes through the optical diffusion element 26, the first illumination beam B1 can be partly reflected by the light splitting element 14 to pass through the first collimator lens 20 and reach the wavelength transformation module 16; the first illumination beam B1 can further partly pass through the light splitting element 14 to reach the reflector 18 through the second collimator lens 22.

The wavelength transformation module 16 can transform the first illumination beam B1 partly reflected from the light splitting element 14 into the second illumination beam B2, and the second illumination beam B2 can pass through the first collimator lens 20 and the light splitting element 14 to be received by the light pipe 24. The reflector 18 can reflect the first illumination beam B1 partly passing through the light splitting element 14 back to the light splitting element 14, and the light splitting element 14 can partly reflect the first illumination beam B1 towards the light pipe 24, so that the light pipe 24 can receive and mix the first illumination beam B1 and the second illumination beam B2. Therefore, the present invention can utilize the reflector 18 that has the coating with a homogenization function and the substrate with a reflection function to enlarge the visual range of the illumination device 10 for the uniform illumination function, in a condition that the wavelength transformation function does not occur or an energy ratio of the wavelength transformation function is less than fifty percent.

Figure 2:
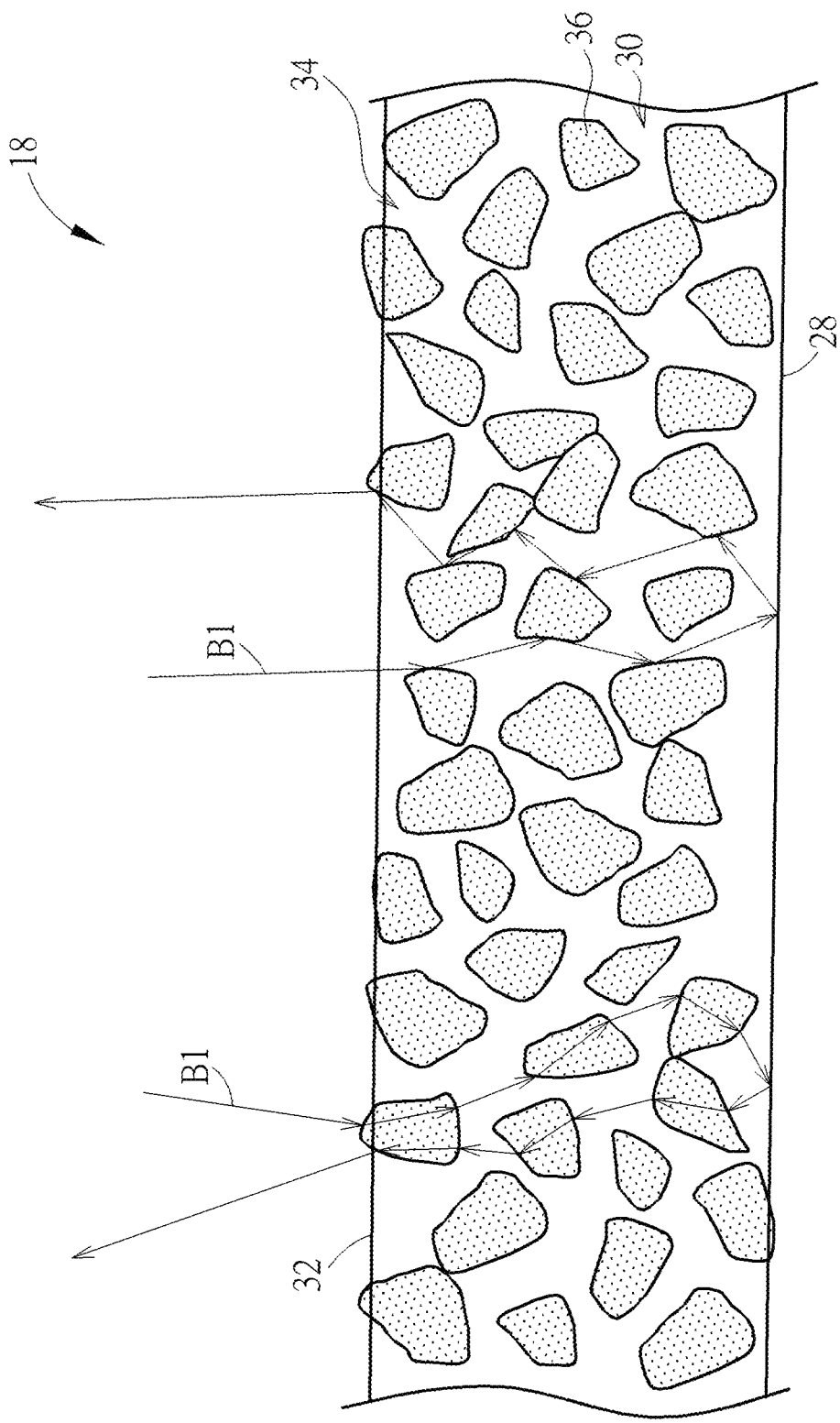
FIG. 2 is a sectional view of a reflector according to the embodiment of the present invention.

Please refer to FIG. 2. FIG. 2 is a sectional view of the reflector 18 according to the embodiment of the present invention. The reflector 18 can at least include a reflection layer 28 and a homogenization layer 30. The reflection layer 28 can reflect the first illumination beam B1 from the light splitting element 14. In the embodiment, the reflection layer 28 can be a coating layer with a reflection feature disposed on a surface of the homogenization layer 30 opposite to an incident surface 32 of the reflector 18; further, the reflection layer 28 can be an optical element with the reflection feature fixed onto the surface of the homogenization layer 30 opposite to the incident surface 32. A thickness ratio of the reflection layer 28 to the homogenization layer 30 is not limited to the embodiment shown in FIG. 2, and depends on the design demand. The incident surface 32 can be an upper surface of the reflector 18 where onto the first illumination beam B1 is projected. The reflection layer 28 can be disposed on a lower surface of the reflector 18.

The homogenization layer 30 can be disposed on the reflection layer 28. The homogenization layer 30 can include packaging material 34 and a plurality of homogenization particles 36. A number, a shape, density and distribution of the homogenization particles 36 are not limited to the embodiment shown in FIG. 2. The plurality of homogenization particles 36 are distributed inside the packaging material 34, and can be individually made of at least one of transparent material and opaque material. When the first illumination beam B1 reaches the reflector 18, the transparent material and the opaque material of the homogenization particles 36 can reflect some part of the first illumination beam B1 and further allow passing of other part of the first illumination beam B1, so that the illumination range of the first illumination beam B1 can be enlarged and the reflector 18 can evenly reflect the first illumination beam B1, and the first illumination beam B1 can be mixed with the second illumination beam B2 to provide the uniform illumination function.

The homogenization particles 36 made of the transparent material and the homogenization particles 36 made of the opaque material of the homogenization layer 30 can be uniformly mixed and distributed inside all areas of the packaging material 34; however, actual application is not limited to the foresaid embodiment. For example, a range of the reflector 18 where onto the first illumination beam B1 is projected can be defined as a projection area of the first illumination beam B1 relative to the reflector 18, and the homogenization particles 36 that are uniformly mixed and made of the transparent material and the opaque material and located on a center of the projection area can have the density different from the density of other homogenization particles 36 that are uniformly mixed and made of the transparent material and the opaque material and located on an edge of the projection area; further, the homogenization particles 36 made of the transparent material and the opaque material may be mixed in a non-uniform manner, and the homogenization layer 30 located on the center of the projection area can have the more homogenization particles 36 made of the transparent material, and the homogenization layer 30 located on the edge of the projection area can have the more homogenization particles 36 made of the opaque material; moreover, the homogenization layer 30 located on the center of the projection area may have the more homogenization particles 36 made of the opaque material, and the homogenization layer 30 located on the edge of the projection area may have the more homogenization particles 36 made of the transparent material.

In the present invention, the homogenization particles 36 can be preferably made of ceramic sintering technology, which depends on the actual demand. Any material and skills of forming an optical transmission path between the homogenization particles 36 to increase reflection efficiency of each homogenization particle 36 can conform to a design scope of the present invention. Generally, each of the homogenization particles 36 can have a rough surface used to provide diffuse reflection, or can have a smooth surface used to provide specular reflection. Besides, a refractive index of the packaging material 34 can be preferably greater than a refractive index of the homogenization particle 36, so that a refraction angle formed by the first illumination beam B1 passing through the packaging material 34 and the homogenization particles 36 can be greater than an incident angle of the first illumination beam B1 projected into the reflector 18, so as to provide the preferred optical divergence and homogenization effects.

The reflector 18 of the present invention can dispose the reflection layer 28 on a bottom of the homogenization layer 30, and further dispose the homogenization particles 36 inside the packaging material 34 to form the coating with the homogenization function. The homogenization particles 36 can preferably reflect some part of the first illumination beam B1 and further allow passing of other part of the first illumination beam B1, as the two first illumination beams B1 shown in FIG. 2. The homogenization particles 36 can be made of the ceramic sintering technology. The non-metallic inorganic material with ionic bonds (such as silica glass, quartz, or other silicon material) can be processed into powders, and the powders can be sintered at the high temperature to grow the powders into the crystal grain for forming the homogenization particles 36. The light beam can pass through gaps between the homogenization particles 36, and can be reflected by the rough surface or the smooth surface of the homogenization particles 36 via the diffuse reflection or the specular reflection, so as to avoid generation of laser speckle and achieve a purpose of the homogenization function.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A reflector comprising:
   a reflection layer adapted to reflect an illumination beam entering the reflector; and
   a homogenization layer disposed on the reflection layer and comprising packaging material and a plurality of homogenization particles, the plurality of homogenization particles being distributed inside the packaging material, and made of at least one of transparent material and opaque material, an illumination range of the illumination beam being enlarged by optical refraction and optical reflection provided by the plurality of homogenization particles of the homogenization layer.

2. The reflector of claim 1, wherein the plurality of homogenization particles is made of ceramic sintering technology.

3. The reflector of claim 1, wherein a refractive index of the packaging material is greater than a refractive index of the plurality of homogenization particles.

4. The reflector of claim 1, wherein the plurality of homogenization particles comprises a rough surface adapted to provide diffuse reflection.

5. The reflector of claim 1, wherein the plurality of homogenization particles comprises a smooth surface adapted to provide specular reflection.

6. The reflector of claim 1, wherein the reflection layer comprises a coating layer with a reflection feature, and is disposed on a surface of the homogenization layer that is opposite to an incident surface of the reflector.

7. The reflector of claim 1, wherein the reflection layer is an optical element with a reflection feature, and is fixed onto a surface of the homogenization layer that is opposite to an incident surface of the reflector.

8. The reflector of claim 1, wherein the homogenization layer does not have a wavelength transformation function, or an energy ratio of the wavelength transformation function of the homogenization layer is smaller than fifty percent.

9. The reflector of claim 1, wherein the homogenization layer comprises the plurality of homogenization particles individually made of the transparent material and the opaque material and uniformly mixed and distributed in all areas of the homogenization layer.

10. An illumination device comprising:
    a solid state light source adapted to provide a first illumination beam with a first wavelength;
    a light splitting element disposed adjacent to the solid state light source, and adapted to allow passing of some part of the first illumination beam and reflect other part of the first illumination beam, and further allow passing of a second illumination beam with a second wavelength;
    a wavelength transformation module disposed on a side of the light splitting element, and adapted to receive the first illumination beam reflected from the light splitting element to generate the second illumination beam with the second wavelength; and
    a reflector disposed on a position of the light splitting element opposite to the solid state light source and the wavelength transformation module, the reflector comprising:
      a reflection layer adapted to reflect the first illumination beam from the light splitting element; and
      a homogenization layer disposed on the reflection layer and comprising packaging material and a plurality of homogenization particles, the plurality of homogenization particles being distributed inside the packaging material, and made of at least one of transparent material and opaque material, an illumination range of the first illumination beam being enlarged by the plurality of homogenization particles so as to mix the first illumination beam with the second illumination beam.

11. The illumination device of claim 10, wherein the illumination device further comprises a first collimator lens and a second collimator lens, the first collimator lens is disposed between the light splitting element and the wavelength transformation, and the second collimator lens is disposed on another side of the light splitting element opposite to the solid state light source and the wavelength transformation module.

12. The illumination device of claim 10, wherein the plurality of homogenization particles is made of ceramic sintering technology.

13. The illumination device of claim 10, wherein a refractive index of the packaging material is greater than a refractive index of the plurality of homogenization particles.

14. The illumination device of claim 10, wherein the plurality of homogenization particles comprises a rough surface adapted to provide diffuse reflection.

15. The illumination device of claim 10, wherein the plurality of homogenization particles comprises a smooth surface adapted to provide specular reflection.

16. The illumination device of claim 10, wherein the reflection layer comprises a coating layer with a reflection feature, and is disposed on a surface of the homogenization layer that is opposite to an incident surface of the reflector.

17. The illumination device of claim 10, wherein the reflection layer is an optical element with a reflection feature, and is fixed onto a surface of the homogenization layer that is opposite to an incident surface of the reflector.

18. The illumination device of claim 10, wherein the homogenization layer does not have a wavelength transformation function, or an energy ratio of the wavelength transformation function of the homogenization layer is smaller than fifty percent.

19. The illumination device of claim 10, wherein the first illumination beam is a blue light beam, the second illumination beam is a yellow light beam, the blue light beam is reflected by the light splitting element to mix with the yellow light beam passing through the light splitting element, so that the illumination device is applied to a white light illumination device of providing uniform illumination intensity.

20. The illumination device of claim 10, wherein the homogenization layer comprises the plurality of homogenization particles individually made of the transparent material and the opaque material and uniformly mixed and distributed in all areas of the homogenization layer.

\* \* \* \* \*